United States Patent [19]

Spiegelberg

[11] 4,334,466
[45] Jun. 15, 1982

[54] HIGH PRESSURE HAY REBALER

[76] Inventor: Delvin A. Spiegelberg, Box 46, Rte. 2, Hortonville, Wis. 54944

[21] Appl. No.: 183,602

[22] Filed: Sep. 2, 1980

[51] Int. Cl.³ .............................................. B65B 13/20
[52] U.S. Cl. .......................................... 100/4; 100/3; 100/7; 100/45; 100/188 R; 100/215; 100/218; 100/250; 100/269 R
[58] Field of Search ........... 100/249, 250, 251, 188 R, 100/7, 3, 4, 240, 215, 218, 45, 8, 269 R

[56] References Cited

U.S. PATENT DOCUMENTS

| | | | |
|---|---|---|---|
| 1,043,041 | 10/1912 | Bryan | 100/45 |
| 1,126,073 | 1/1915 | Peterson | 100/240 |
| 3,082,588 | 3/1963 | Jay | 100/3 |
| 3,141,401 | 7/1964 | Lindemann | 100/215 X |
| 3,426,672 | 2/1969 | Nolt | 100/250 X |
| 3,580,166 | 5/1971 | Longo | 100/250 |
| 3,724,713 | 4/1973 | Coren | 100/240 X |
| 3,747,519 | 7/1973 | Capps | 100/250 |
| 3,828,663 | 8/1974 | Poplinski | 100/249 |
| 3,927,612 | 12/1975 | Friz | 100/215 |
| 4,090,440 | 5/1978 | Jensen | 100/4 |
| 4,150,613 | 4/1979 | Smee | 100/3 |
| 4,158,994 | 6/1979 | Jensen | 100/3 |
| 4,182,236 | 1/1980 | Greer | 100/218 X |
| 4,184,426 | 1/1980 | Oosterling | 100/218 X |

Primary Examiner—Billy J. Wilhite
Attorney, Agent, or Firm—Wheeler, House, Fuller & Hohenfeldt

[57] ABSTRACT

Baling press adapted to receive dried ordinary bales of hay and to compress them further, particularly to facilitate shipment of the bales.

The press comprises a longitudinally extending compression chamber having substantially rigid lateral walls, an upstream end wall comprising a ram longitudinally movable between upstream and downstream extremes of movement, and a downstream end wall comprising an exit gate.

The compression chamber is provided with novel bale ejection means comprising a longitudinally extending endless chain loop with first and second runs, the first run being attached to the ram and the second run being attached to a barbed ejection plate which engages and ejects bales in the compression chamber while moving downstream and which disengages matter within the compression chamber when moving upstream.

The ram is moved downstream and the exit gate is prevented from opening by hydraulic cylinders connected to a common fluid supply so that each is actuated at the same time and supplied with the same pressure.

The press includes feed measuring means which measure a selected number of ordinary bales of hay responsive to downstream movement of said ram, and which feed the pre-measured bales into the compression chamber responsive to upstream motion of said ram.

The lateral walls of the compression chamber first taper inwardly toward a central waist portion of the compression chamber, and the lateral walls then taper outwardly downstream of said waist portion and upstream of the gate.

9 Claims, 6 Drawing Figures

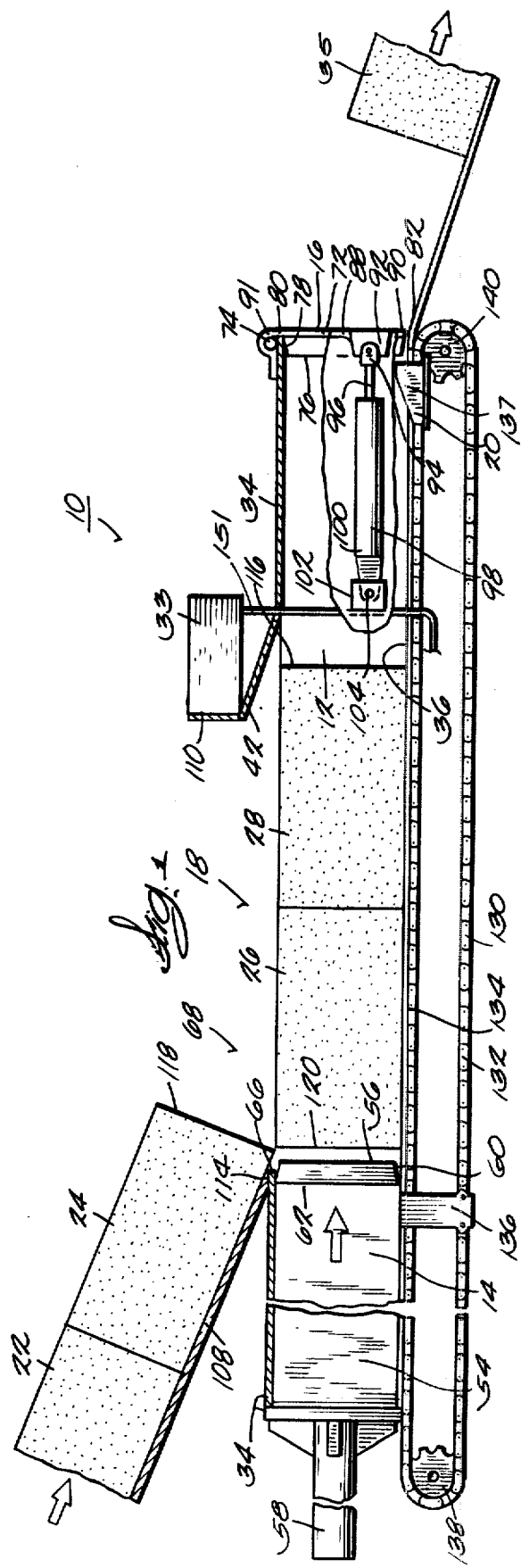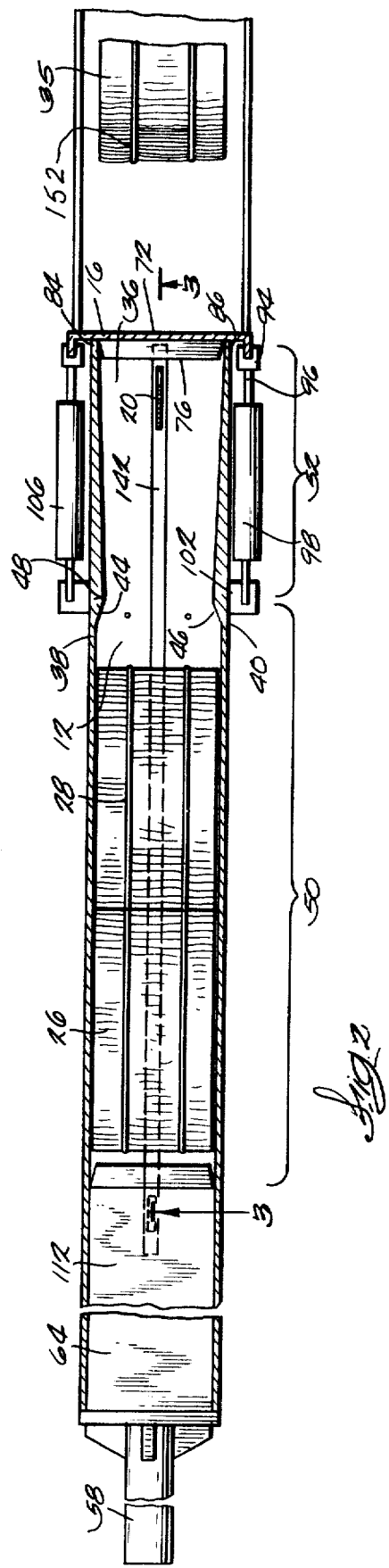

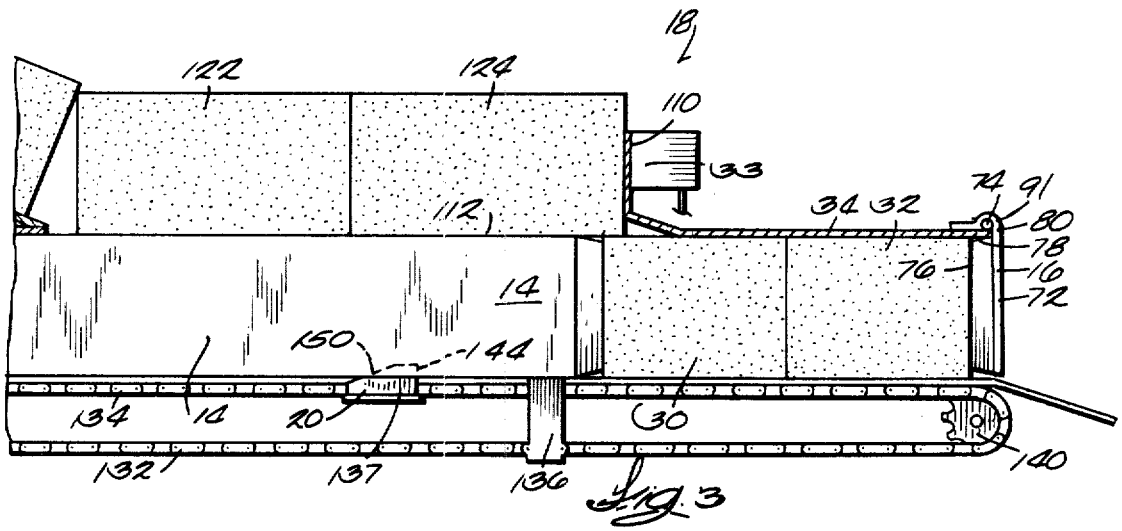
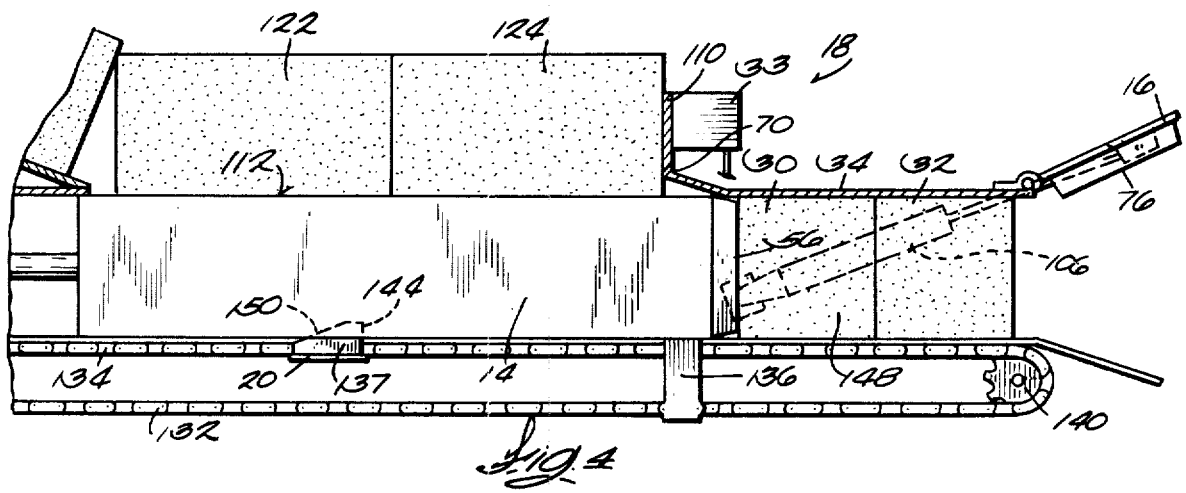
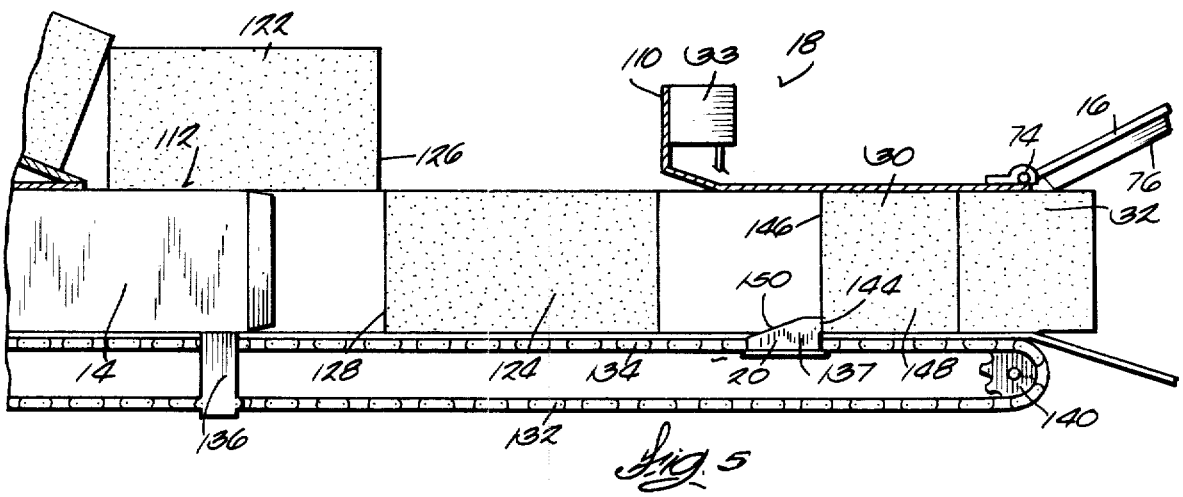

HIGH PRESSURE HAY REBALER

The present invention relates most generally to a press which is used to compress a fibrous material into highly compressed bales which are then secured to form easily transportable commercial units. More specifically, the present invention relates to such presses of a type adapted to receive ordinary field baled hay and to compress it into highly compressed bales which can be transported more easily and economically than field baled hay.

Baling presses per se are well known in the art. An early example of such a press is found in U.S. Pat. No. 1,126,073 issued to Peterson et al. on Jan. 26, 1915. This reference shows a tapered baling press which is used with a manual screw. Bales enter and leave the press from the same opening.

U.S. Pat. No. 3,580,166, issued to Longo on May 25, 1971, teaches a waste compactor comprising a longitudinally extending compression chamber having a ram as its upstream end wall, an exit gate as its downstream end wall, feed means disposed laterally of the compression chamber, and a reciprocating measuring platform attached to the ram to block the influx of waste during the ramming stroke and to allow new waste to enter the compression chamber during the return stroke of the ram. Longo does not teach an automatic exit gate opening or closing structure, however. In Longo, when material is to be removed from the compression chamber the exit door is manually opened and the ram is actuated to provide a longer than normal downstream stroke to eject the waste from the compression chamber. Thus, Longo does not provide truly automatic operation.

U.S. Pat. No. 3,747,519, issued to Capps Sr. et al. on July 24, 1973, teaches a trash compacting apparatus which includes a hydraulic cylinder to open the exit gate thereof. When the exit gate is closed, it remains in that position during the compacting operation because it is adapted to open substantially vertically, rather than horizontally. The Capps reference teaches no connection between the pressure line used to operate the hydraulic ram and the pressure line used to operate the exit door hydraulic cylinder. The Capps reference also teaches that the compressed matter can be ejected from the cylinder by a long stroke of the ram.

Poplinski, issued as U.S. Pat. No. 3,828,663 on Aug. 13, 1974, shows a trash compactor with a hydraulically operated exit gate. However, it should be noted that the hydraulic cylinder provides an opening or closing force to the exit gate which is transverse to the direction of flow of trash or other material through the exit gate. Poplinski also shows an inwardly tapered exit tube segment followed in the downstream direction by an outwardly tapering portion. These tapered portions are downstream of the exit gate, however.

U.S. Pat. No. 4,090,440, issued to Jensen on May 23, 1978 shows apparatus for recompacting fibrous materials such as bales of hay. Jensen uses a structure in which the feed and the exit gate are in line, and are laterally disposed with respect to the direction of compression by hydraulic cylinder 14. In the Jensen apparatus, ordinary bales of hay are forceably fed into the compression chamber using a second hydraulic cylinder and ram. Jensen does not teach any tapering of the compression chamber. The Jensen apparatus also is adapted to compress one bale of hay at a time, so that multiple bales of ordinary hay are not recompressed to form a single bale of higher density. This Jensen patent has a disclosure substantially identical to that of its divisional case, U.S. Pat. No. 4,158,994, issued to Jensen on June 26, 1979.

Two other references may also be slightly relevant to an understanding of the present invention: they are Friz, et al (U.S. Pat. No. 3,927,612 issued on Dec. 23, 1975) and Coren, issued as U.S. Pat. No. 3,724,713 on Apr. 3, 1973.

The Jensen references indicate the value of recompressing dried ordinary bales of hay to form denser bales which occupy less space. Such bales cannot be formed in the field as the hay is first gathered into bales, for at this time the hay is too moist to permit high pressure baling. An attempt to form high pressure bales from newly mown hay will result in bales which are subject to bacterial decomposition and even spontaneous combustion under the right circumstances. Thus the hay is originally baled to facilitate its handling and is then dried for several months before being rebaled as described herein.

The present invention is an advance over prior apparatus used in compacting and rebaling operations in several respects.

First, none of the prior art teaches the means taught herein to eject compressed bales from the compression chamber of the apparatus. The art-recognized way of ejecting finished bales from a compression chamber is to provide for a longer than usual stroke of the ram in order to force the compacted material out an exit gate. This ejection method has two disadvantages. First, it is slower than the ejection means taught herein, for the ram must execute a long stroke in order to eject the hay from the compression chamber. The ejection cycle must be completed and the ram must retract an extra distance before more hay can be fed into the compression chamber. Second, when the completed bales of compressed material are ejected from the chamber by the ram, the means to prevent the exit gate from opening during a compression stroke must be controlled independently of the pressure cylinder used to advance the ram in order to keep the exit gate closed during the compression stroke while keeping the exit gate open during an ejection stroke.

Another feature of the present invention which distinguishes it from the cited references is the provision of a compression chamber with an inwardly tapered upstream portion, a central waist portion and an outwardly tapered downstream portion. The purpose of the inwardly tapered portion is to compress the bale so that its lateral profile is quite small. The purpose of the outwardly tapered downstream portion of the compression cylinder is to allow the bale to be more easily ejected from the portion of the compression chamber nearest the exit gate. This doubly tapered compression chamber allows high compressing forces to be applied to the bale, and yet allows the bale to be ejected from the press quite easily so that a second hydraulic ram is not needed to eject the bales from the chamber.

Thus, the primary objects of the present invention are to provide rebaling apparatus which requires a minimal control mechanism, which minimizes the length of stroke of the ram hydraulic cylinder, and which provides for easy loading, maximum compression, and easy ejection of the recompressed bales of fibrous material.

SUMMARY OF THE INVENTION

Expressed one way, the present invention is a rebaling press adapted to produce a highly compressed bale of fibrous material, comprising:

a. a longitudinally extending compression chamber having substantially rigid top, bottom and side lateral walls, an upstream end wall comprising a ram longitudinally movable between upstream and downstream extremes of movement, and a downstream end wall comprising an exit gate;

b. feed means adapted to feed slightly compressed bales of fibrous material to the upstream portion of the compression chamber, comprising a feed opening in the top wall of the compression chamber sized to accomodate a pre-determined number of slightly compressed bales and having an upstream end nearly adjacent to the upstream extremity of movement of the ram and a downstream end upstream of the downstream extremity of movement of the ram; a generally horizontal measuring platform within the compression chamber attached to the top of the ram, disposed generally upstream of the ram, and positioned to substantially cover the feed opening when the ram is at its downstream extreme of movement and to substantially uncover the feed opening when the ram is at its upstream extreme of movement; and means to continuously supply slightly compressed bales onto the measuring platform responsive to the downstream movement of the measuring platform;

c. means to reciprocate the ram between its upstream and downstream extremes of movement to alternately load the compression chamber with a pre-determined number of slightly compressed bales and to compress them to form single, highly compressed bales;

d. binding means for each highly compressed bale adapted to prevent the highly compressed bales from re-expanding substantially; and e. ejection means to open the exit gate and to eject the highly compressed bales from the rebaling press.

Expressed another way, the present invention is a rebaling press adapted to produce a highly compressed bale of fibrous material, comprising:

a. a longitudinally extending compression chamber having substantially rigid top, bottom, and side walls, an upstream end wall comprising a ram longitudinally movable between upstream and downstream extremes of movement and a downstream end wall comprising an exit gate, wherein an upstream portion of the compression chamber tapers inward in the direction of flow, an intermediate portion of the compression chamber comprises a waist portion of smaller transverse dimensions than those of the intended highly compressed bale, and a downstream portion which tapers outward in the direction of flow;

b. feed means adapted to feed slightly compressed bales of fibrous material to the upstream portion of the compression chamber;

c. means to reciprocate the ram between its upstream and downstream extremes of movement in order to alternately load the compression chamber with a pre-determined number of slightly compressed bales and to compress them to form, single, highly compressed bales;

d. binding means adapted to prevent the highly compressed bales from re-expanding substantially; and e. means to open the exit gate and to eject the highly compressed bales from the rebaling press after they are completed.

Expressed a third way, the present invention is a press of the type comprising a longitudinally extending compression chamber with substantially rigid top, bottom and side lateral walls, an upstream end wall comprising a longitudinally movable ram, a downstream end wall comprising an exit gate, lateral feed means between the upstream and downstream walls, and ejection means to discharge compacted material through the exit gate. Improved ejection means of the press comprise:

a. an endless conveyor adjacent at least one of the lateral walls, having longitudinally extending first and second runs arranged so that downstream movement of the first run results in upstream motion of the second run and vice versa;

b. means connecting the first run to the movable ram so that longitudinal movement of the ram causes corresponding longitudinal movement of the first run; and c. barbed means attached to the second run and adapted to engage the highly compressed finished bales and move them downstream when the second run moves downstream and to disengage any material within the compression chamber when the second run moves upstream.

Expressed still another way the present invention a press is provided of the type comprising a longitudinally extending compression chamber having substantially rigid top, bottom and side lateral walls, an upstream wall comprising a longitudinally movable hydraulic ram, a downstream wall comprising a hydraulically closed exit gate, and first and second double action hydraulic cylinders to respectively reciprocate the ram and to open and close the exit gate. The hydraulic cylinders are supplied with pressurized hydraulic fluid in such a manner that the exit gate opens when the ram is moving upstream and the exit gate closes when the ram is moving downstream.

BRIEF DESCRIPTION OF DRAWINGS

FIG. 1 is a side elevational view of the rebaling apparatus of the present invention, cut away to show the elements of the interior of the machine.

FIG. 2 is a plan view of the machine of FIG. 1, with the top of the compression chamber and the feed means omitted for a greater clarity.

FIGS. 3, 4, 5 are vertical, longitudinal cross sections of the rebaling machine of FIGS. 1 and 2, showing successive portions of the compression and retraction cycle of the hydraulic ram.

DESCRIPTION OF THE INVENTION

Figure 6:
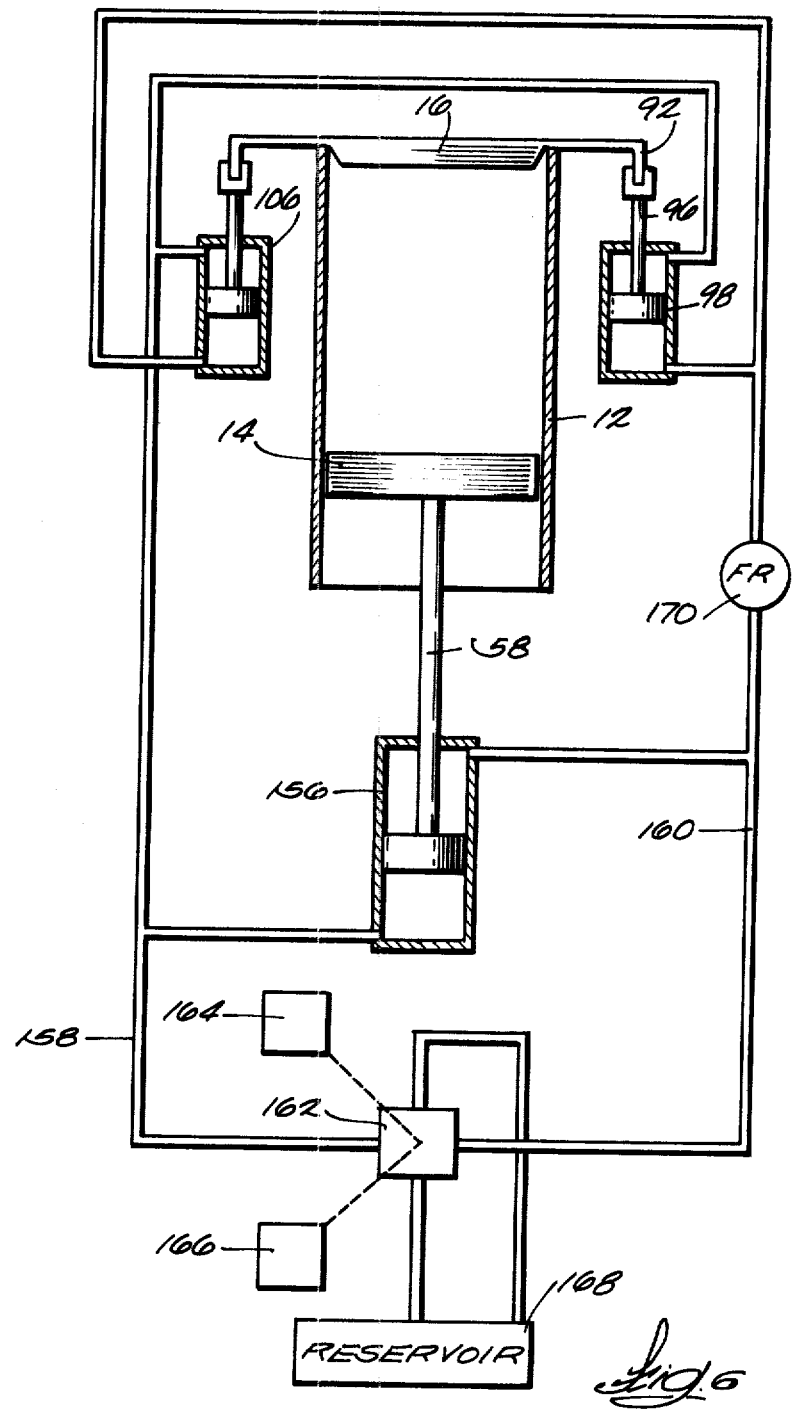
FIG. 6 is a schematic view of the hydraulic system of the rebaling apparatus of the present invention.

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

The main elements of the present invention are best shown in FIG. 1. In FIG. 1, a rebaling press 10 is provided, generally comprising a longitudinally extending compression chamber 12, a longitudinally movable ram 14, an exit gate 16, feed means generally indicated as 18, and bale ejection means generally indicated as 20.

The basic operation of the machine is (briefly) as follows:

A pair of bales such as 22 and 24, which are conventional bales of hay (known herein as field baled hay or slightly compressed bales), are fed into compression chamber 12 by bale feed means generally indicated as 18 into the position occupied by bales 26 and 28. Although two bales are here shown to constitute one charge of the compression chamber 12, the pre-determined number of bales could be reduced to one or increased to three or more bales. The bales are fed into compression chamber 12 while ram 14 is in its fully retracted position as shown in FIG. 1.

After slightly compressed bales such as 26 and 28 are loaded into compression chamber 12, ram 14 is actuated and moved downstream toward exit gate 16. Gate 16 is held closed at this point to prevent premature ejection of bales. FIGS. 3 and 4 illustrate the successive forward movement of ram 14 to compress bales such as 30 and 32 to form a single, highly compressed bale which is then bound together by binding means 33 (shown schematically in FIG. 1.) Such binding means are conventional in the art.

In FIG. 5, ram 14 is shown retreating while exit gate 16 is open to allow the single highly compressed bale formed from slightly compressed bales 30 and 32 to leave the compression chamber as the reresult of the action of bale ejection means 20. As shown in FIG. 1, the highly compressed bales 35 are then conveyed away from the rebaling machine by suitable means (not shown).

The elements just described and their manner of operation will now be described in greater detail.

COMPRESSION CHAMBER (12)

Compression chamber 12 has four lateral walls: Top wall 34 and bottom wall 36 (FIG. 1); and side walls 38 and 40 (FIG. 2.) Top wall 34 has an inwardly tapered surface 42, side walls 38 and 40 have inward tapered surfaces 44 and 46 respectively. Thus, the upstream portion of the compression chamber, defined as the portion of compression chamber 12 lying upstream of waist portion 48, is tapered inwardly from either a vertical or a horizontal perspective within the compression chamber 12. Bottom wall 36, however, is preferably substantially flat throughout compression chamber 12 to promote flow.

Waist portion 48 of compression chamber 12 defines an intermediate portion of the compression chamber which has horizontal and vertical lateral dimensions smaller than the intended dimensions of the final highly compressed bale. The inward taper of upstream portion 50 of compression chamber 12 helps to feed the bales into the waist portion 48 of the compression chamber and facilitates lateral compression of the bales. It will be noted, however, that the tapers showed in FIGS. 1 and 2 are exaggerated for the sake of illustration.

The portion of compression chamber 12 downstream of waist portion 48 is the downstream portion 52 of compression chamber 12. As shown in FIG. 2, side walls 38 and 40 of compression chamber 12 are outwardly tapered in downstream portion 52. This outward taper, although slight, enables the bales to be more easily ejected from the compression chamber after gate 16 is opened.

In the present embodiment of the invention the outward taper of side walls 38 or 40 between waist portion 48 and exit gate 16 is on the order of ⅛ inch, while the downstream portion of the compression chamber is about 4 feet long. The inward taper of side walls 38 and 40 in the upstream portion of the compression chamber is about ⅛ inch also, although the pitch of the taper is much greater in the upstream portion 48 than in the downstream portion 52 of the compression chamber 12. The pitch of inwardly tapered surface 42 of top wall 34 of compression chamber 12 is not especially critical since surface 42 is provided mainly to promote feeding of bales downstream into waist portion 48 of compression chamber 12.

THE RAM (14)

Ram 14 comprises a housing 54, a ramming face 56, a hydraulic cylinder connecting rod 58 and double action hydraulic cylinder means (not shown) to provide a downstream ramming force or an upstream ram retraction force, via hydraulic cylinder connecting rod 58, to ram face 56 of ram 14.

Ram face 56 has a highly beveled edge 60 so that ram face 56 is somewhat downstream of the plane 62 (edgewise in FIG. 1) which marks the greatest lateral extent of the ram. The small longitudinal distance maintained between ram face 56 and plane 62 insures that small bits of hay or other debris will not be caught between ram housing 54 and the top, bottom or side walls 34,36,38 and 40 of compression chamber 12.

The top portion 64 of ram housing 54 is a measuring platform. The function of the measuring platform will be explained later as part of the feed means to measure and feed bales of hay into the compression chamber of the hay rebaling machine.

In this embodiment of the invention ram housing 54 has a transverse cross-section resembling an inverted "U".

Ram 14 is adapted to reciprocate in compression chamber 12 in a longitudinal direction. The upstream extreme of movement of ram 14 is shown in FIG. 1 to be nearly adjacent the upstream end 66 of feed opening 68 in the top wall 34 of compression chamber 12. The downstream extreme of movement of the ram is shown in FIG. 4, wherein face 56 of ram 14 is nearly adjacent (and somewhat downstream of) the downstream end 70 of feed opening 68. The movement of ram 14 between said upstream and downstream extremes of movement is explained elsewhere in greater detail.

EXIT GATE (16)

Exit gate 16 is the downstream end wall of the compression chamber 12. Exit gate 16 covers the downstream terminal end of compression chamber 12 when hay is being compressed in the machine, and is adapted to automatically open when a highly compressed bale of hay is to be ejected from the machine. Exit gate 16 comprises a flap 72 which pivots about pivot pin 74. Pivot pin 74 is oriented with its pivotal axis perpendicular to the direction of flow of material within compression chamber 12. Although in this embodiment of the invention pivot pin 74 is located adjacent top wall 34 of compression chamber 12, it will be evident that pivot pin 74 could also be adjacent side walls 38 or 40 or bottom wall 36 of compression chamber 12. The upstream extremity of flap 72 is exit gate face 76. The beveled edges such as 78 of exit gate face 76 guide exit gate face 76 between the downstream extremities 80,82,84 and 86 of side walls 34,36,38 and 40 while flap 72 is closed to provide a tight fit. The beveled edge 78 of exit gate face 76 also acts like the beveled edge 60 of ram face 56 to prevent hay from jamming in the space between the perimeter of exit gate face 76 and the downstream extremities 80, 82, 84 and 86 of the side, top and bottom walls of compression chamber 12.

Exit gate 16 is provided with means to automatically open it and to maintain it tightly closed at particular portions of the compression cycle. As shown in FIG. 1, flap 72 of exit gate 16 has side edges such as 88, a bottom edge 90, and a top edge 91 adjacent pivot pin 74. The side edges such as 88 of flap 72 are attached to, or integrally formed with, ears 92 which extend generally upstream from flap 72 and which lie laterally outside of the side walls such as 40 of compression chamber 12.

The ear 92 of flap 72 is connected via pivotal linkage 94 to the piston rod 96 of a conventional double action hydraulic cylinder 98. Cylinder body 100 of hydraulic cylinder 98 is attached to a fixed frame member 102 of the machine via a pivotal linkage 104. In a highly preferred mode of the present invention hydraulic cylinder 98 is aligned with its long axis substantially parallel to the downstream direction of flow of hay bales within compression chamber 12.

Also highly preferred is an embodiment in which pivotal linkage 94 is attached to ear 92 at a pivot point which is closer to bottom edge 90 of flap 72 than to top edge 91 of the flap 72, whereby to provide a mechanical advantage to increase the upstream force applied when piston rod 96 is drawn upstream into hydraulic cylinder 98. It will be noted, however, that a trade-off exists between the necessary length of travel of piston rod 96 and the diameter of cylinder body 100. If a slender hydraulic cylinder is used, a longer stroke length must be provided and pivotal linkage 94 must be connected fairly close to bottom edge of 72, while if a hydraulic cylinder of greater diameter is used, pivotal linkages 94 or 104 may be moved upward and the travel of piston rod 96 can be correspondently reduced. Thus, the exact vertical placement of pivotal linkage 94 and of hydraulic cylinder 98 and pivotal linkage 104 is a matter of some importance.

In this embodiment of the invention, as best shown in FIG. 2, two hydraulic cylinders, 98 and 106 are provided. They are respectively positioned adjacent side walls 40 and 38 of the compression chamber. Although this embodiment of the invention requires two double action hydraulic cylinders and their associated linkages in order to provide automatic opening and closing means for gate 16, the advantage of this system is that the hydraulic cylinders have a mechanical advantage which helps them to resist opening of exit gate 16.

BALE FEED MEANS (18)

Bale feed means 18 is adapted to feed a continuous longitudinal line of bales such as 22 and 24 into compression chamber 12 so that they occupy the positions indicated for bales 26 and 28, although bales 26 and 28 are shown slightly forward of the position at which they enter compression chamber 12. Bale feed means 18 generally comprise a bale supply ramp 108, feed opening 68 formed in top wall 34 of compression chamber 12, a measuring platform 112 on the top portion 64 of ram housing 54 (FIG. 3) and means (not shown) to reciprocate ram 14 within compression chamber 12 between the upstream and downstream extremities of movement defined above.

In this embodiment of the invention, bale supply ramp 108 is a vertically inclined gravity roller conveyor which allows a continuous line of bales such as 22 and 24 to move vertically downward and downstream with respect to the orientation of compression chamber 12.

This allows a continuous line of bales to be supplied to feed opening 68 so that the longest dimension of each bale lies in the same plane as the line of downstream movement through compression chamber 12. Bale supply ramp 108 could also be a simple slide or endless belt, for two examples, without departing from the present invention. But a gravity feed system is preferred, as this eliminates the need to provide a drive mechanism and a control mechanism for bale supply ramp 108. Bales of hay may be placed on bale supply ramp 108 by any suitable means, such as by manual carrying or by a suitable automatic conveyor. The bale supply ramp 108 is oriented with respect to the feed opening 68 so that the downstream extremity 114 of bale supply ramp 108 is immediately above and adjacent upstream end 66 of the feed opening 68.

The dynamic function of feed means 18 as shown in FIGS. 1 through 5 will now be described in greater detail.

In FIG. 1, ram 14 is positioned so that ramming face 56 is at its upstream extremity of movement. At this stage of the ramming or feeding cycle, bales such as 26 and 28 have just dropped into compression chamber 12 via feed opening 68. At this point the leading edge 116 of the forward bale 28 lies just downstream of bale stop 110 because the leading edge 118 of the first bale (24) in line on bale supply ramp 108 catches the trailing edge 120 of bale 26; bale 26 is thus urged downstream by the line of bales such as 22 and 24. It is not necessary, however, that there be any engagement between leading edge 118 of bale 24 and trailing edge 120 of bale 26, since it is only necessary that the leading edge 118 of bale 24 be restrained from traveling beyond bale stop 110.

In FIG. 3, ram 14 has moved downstream to a considerable extent, so that bales such as 30 and 32 in FIG. 3 are substantially compressed between ram 14 and forceably closed exit gate 16. At this stage in the ramming cycle, horizontal measuring platform 112, which is disposed generally upstream of ram face 56, has moved downstream a considerable extent. Concurrent with this downstream movement of measuring platform 112, the blades 22 and 24 of FIG. 1 have moved into the positions occupied by bales 122 and 124 in FIG. 3. In this mode of the invention, bales are thus fed onto measuring platform 112 due to the gravitational force which moves bales down bale supply ramp 108. Bales are also urged forward onto measuring platform 112 because platform 112 pulls the bales as it moves downstream. FIG. 3 illustrates that during a compression cycle, measuring platform 112 and the top surfaces of bales such as 30 and 32 form a continuous surface so that during the hay compressing stroke the feed opening 68 is continuously blocked to prevent bales such as 122 and 124 from falling into compression chamber 12 via feed opening 68. By the time ram 14 has reached its downstream extremity of movement as shown in FIG. 4, bales 122 and 124 have slid forward to bale stop 110, and thus are positioned to be fed into compression chamber 12.

The feeding of bales such as 122 and 124 via feed opening 68 into compression chamber 12 is successively illustrated in FIGS. 5 and 1. In FIG. 5, ram 14 is retracting, and measuring platform 112 is concurrently withdrawing upstream, uncovering a portion of feed opening 68. When a bale such as 124 is no longer supported by measuring platform 112, it falls into compression chamber 12 as shown in FIG. 5. As measuring platform 112 recedes still further the following bale 122 also loses its support. It will be noted that the bale such as 122 in FIG. 5 is prevented from moving downstream to cover bale 124 in two ways. First, the leading edge 126 of bale 122 will frequently engage the following edge 128 of bale 124. Second, the upstream movement of horizontal platform 112 prevents downstream motion of bale 122 due to frictional engagement between the bottom of bale 122 and the surface of measuring platform 112.

When the ram, and consequently measuring platform 112, have completely retracted once more as shown in FIG. 1, a second bale such as 122 in FIG. 5 is also allowed to drop into compression chamber 12 via feed opening 68. This completes the feeding cycle which will then repeat continuously so long as slightly compressed bales are supplied to feed opening 68 via bale supply ramp 108.

BALE EJECTION MEANS (20)

Bale ejection means 20 generally comprises a moving endless conveyor 130 having a first run 132 and a second run 134, a linkage 136 connecting first run 132 to ram housing 54, and barbed bale engaging means 137 linked to second run 134 of moving endless conveyor 130.

In the present embodiment of the invention, conveyor 130 is a drive chain carried by sprockets 138 and 140. Conveyor 130 is arranged so that first run 132 and second run 134 are parallel to the direction of flow of material within compression chamber 12. Conveyor 130 is preferably arranged to be completely outside compression chamber 12, although it is not important to arrange conveyor 130 below the compression chamber 12. Conveyor 130 could also be arranged to be adjacent side wall 38 or side wall 40 without departing from the scope of the present invention. The parallel first and second runs 132 and 134 of conveyor 130 are arranged so that upstream movement of first run 132 will result in downstream motion of second run 134, and so that downstream movement of first run 132 will result in upstream motion of second run 134.

The linkage 136 between first run 132 of conveyor 130 and ram housing 54 causes the first run 132 to move parallel to ram housing 54 (and in the same direction) as ram 14 reciprocates between its upstream and downstream extremities of movement. Linkage 136 communicates between ram housing 54 and first run 132 via a slit 142 in bottom wall 36 of compression chamber 12 (FIG. 2.) Slot 142 is preferably centered between side walls 38 and 40 of compression chamber 12, and slot 142 is arranged with its long dimension parallel to the direction of flow of material in compression chamber 12. The longitudinal extent of slot 142 is such that linkage 136 and bale engaging means 137 each pass through slot 142 at all times during a hay compression and ejecting cycle. This requires that slot 142 must extend downstream to a point quite near the outlet of the compression chamber 12, and that the slot must extend upstream beyond the upstream end 66 of feed opening 68 in order to function properly. The lateral extent of slot 142 is such that bale engaging means 137 and linkage 136 can pass by each other at the point in the compression and retraction strokes where they are laterally beside each other.

Referring now to FIG. 5, barbed bale engaging means 137 is a metal plate (or like member) arranged with its larger faces lying substantially in a vertical plane. Bale engaging means 137 has a leading edge 144 at its downstream extremity which extends upward through slot 142 in bottom wall 36 sufficiently to engage the trailing edge 146 of the single highly compressed bale of hay 148 made from original bales 30 and 32. Bale engaging means 137 has a trailing edge 150 which is beveled. Trailing edge 150 is adapted to slide under or through the hay within compression chamber 12 when bale engaging means 137 is moved upstream. Bale engaging means 137 defines barbed means which, when moving upstream, is adapted to disengage with and slide by the hay in compression chamber 12, and which is adapted to positively engage a bale of hay in compression chamber 12 and to eject it from the compression chamber when bale engaging means 137 is moving downstream.

The respective positions of bale engaging means 137 on second run 134 and of linkage 136 on first run 132 are such that when ram housing 54, and thus linkage 136, are each at their upstream extremities of movement, bale engaging means 137 is at its downstream extremity of movement, and is adjacent, but upstream of, exit gate 16.

Means must be provided to allow bale engaging means 137 to pass by ram face 56 and ram housing 54 when ram 14 is moving downstream and bale engaging means 137 is moving upstream. Although various means can be defined to accomplish this objective, in the present embodiment a longitudinal slot (not shown) is provided in the bottom of ram face 56. The slot has sufficient vertical extent to allow bale engaging means 137 to pass directly through ram face 56.

The function of bale ejection means 20 during a ramming cycle will now be described. This is shown in succession in FIGS. 1 through 5. FIG. 1 illustrates that at the beginning of a ramming cycle, when ram 14 is at its upstream extremity of movement, bale engaging means 137 is at its downstream extremity of travel and is nearly adjacent exit gate 16. FIG. 3. shows that as a consequence of the downstream motion of ram 14, bale engaging means 137 has been drawn upstream and has passed through ram face 56. Although hay bales such as 30 and 32 substantially fill the lower part of compression chamber 12 during the upstream travel of bale engaging means 137, bale engaging means 137, due to its beveled trailing edge 150, is capable of remaining disengaged from bales such as 30 and 32. In FIG. 4 the bale engaging means 137 has reached its upstream extremity of movement, and at the same time ram 14 has reached its downstream extremity of movement.

When ram 14 retracts, as shown in FIG. 5, bale engaging means 137 and ram face 56 have again exchanged longitudinal positions in compression chamber 12 as described above, and leading edge 144 of bale engaging means 137 engages the trailing edge 146 of highly compressed bale 148. Highly compressed bale 138 is then forceably ejected from gate 16, which meanwhile has opened. Thus, the highly compressed bale 148 is ejected from the compression chamber during the retraction of ram 14. As a result, the maximum stroke of ram 14 is no longer than necessary to effect compression of bales, thus saving in the cost of equipment. As well, the provision of ejection means 20 largely eliminates unproductive time during the retraction of ram 14, for highly compressed bales can move downstream within the compression chamber even while ram 14 is retracting, so that a new compression cycle can begin momentarily after the preceeding bale is ejected.

HYDRAULIC SYSTEMS

What follows is a description of the fluid connections to the second double acting hydraulic means which opens and closes gate 16 and the double acting hydraulic cylinder means which reciprocates ram 14 between its upstream and downstream extremities of movement. The hydraulic system is shown schematically in FIG. 6.

Hydraulic cylinders 98 and 106 which open and close exit gate 16 and the hydraulic cylinder 156 which reciprocates ram 14 are all double action hydraulic cylinders. That is, pressurized hydraulic fluid may be introduced into the cylinders on either side of their pistons, so that their piston rods may be advanced or retracted with respect to their cylinder bodies by positive hydraulic pressure. For clarity the mode of introducing fluid into a double-action hydraulic cylinder which tends to push the piston rod out of the cylinder body will be described as extending pressure, while the mode of introducing fluid into a hydraulic cylinder which tends to retract the piston rod into the cylinder body will be called retracting pressure.

As one novel feature of the present invention, the first fluid conduit means 158 which supplies extending pressure to the ram hydraulic cylinder 156 in order to move the ram downstream also applies retracting pressure to the hydraulic cylinders 98 and 106 which control gate 16. The respective hydraulic cylinders are so sized, and the hydraulic cylinders are so linked to the exit gate 16, that the closing force applied in the upstream direction to exit gate 16 exceeds somewhat the downstream compression pressure applied to ram 14. As a result, exit gate 16 will tend to remain closed during the entire compression cycle. Hydraulic cylinders 98 and 106 are supplied with extending pressure by second fluid conduit means 160 which also apply retracting pressure to hydraulic cylinder 156 which actuates ram 14. The arrangement of hydraulic cylinders shown herein is thus very simple to control, since all three hydraulic cylinders may be controlled by two way hydraulic valve means 162. Valve means 162 is switched between a first position, which retracts the gate hydraulic cylinders and extends the ram cylinder, and a second position which reverses the motion of all the hydraulic cylinders. The valve is switched by first and second control means 164 and 166 tripped by linkage 136 when it reaches its respective upstream and downstream extremities of movement. Fluid is supplied to valve 162 for distribution under pressure by fluid supply means 168. Thus one control mechanism may be used to control the movement of ram 14 and the movement of exit gate 16.

Because the pressure available in the hydraulic system is far too great for opening the exit door, a one way flow restriction valve 170 is placed in second conduit means 160 to limit the opening speed of gate 16 to a reasonable rate in light of the absence of resistance to gate opening.

Although binding means are not explicitly shown in FIGS. 1 through 5, it will be evident to those of ordinary skill in the art that any of the well known means can be adapted to apply binding straps to the highly compressed bales of hay as they become compressed to the maximum extent. Appropriate binding means, for example, may be found in U.S. Pat. No. 4,090,440 cited above, the disclosure of which is hereby incorporated herein by reference.

OPERATION

Now that all the elements of the rebaling press of FIGS. 1 through 5 have been introduced, the complete function of the entire machine can now be explained more fully.

The beginning of a compressing cycle is illustrated by FIG. 1. Bales 26 and 28 have fallen into the confines of compression chamber 12 through feed opening 68. Ram 14 has reached its upstream extremity of movement and has started to move downstream because an extending force has been applied to the hydraulic cylinder (not shown) which drives ram 14 forward via connecting rod 58. Exit gate 16 is already closed because a door closing force has already been applied to hydraulic cylinders 98 and 106, which fully retract much more quickly than the hydraulic cylinder operating ram 14 can fully extend. At this state bale 24, carried by bale supply ramp 108, has advanced sufficiently that leading edge 118 of bale 24 has engaged trailing edge 120 of bale 26, thus preventing further travel of bale 24 at this point. Concurrently, bale engaging means 137 is at its downstream extremity of movement and is starting to proceed upstream due to the upstream motion of run 134 of endless conveyor 130. During its upstream motion, bale engaging means 137 will freely slide upstream with respect to any material found within compression chamber 12.

Moving now to FIG. 3, bales 30 and 32, which correspond with bales 26 and 28 of FIG. 1, have been forced downstream in compression chamber 12 past waist portion 48 of the compression chamber and into the downstream portion 52 of compression chamber 12. Only a small part of bale 30 has not yet been forced through waist portion 48 and thus confined to its fullest extent. At this point the bale binding means 33 has lapped new bale straps such as 152 (FIG. 2) around the leading, top and bottom faces of bale 32, and about the top and bottom surfaces of bale 30. Since at this state of the operation the leading edge of bale 32 is being compressed against exit gate 16, the hydraulic cylinders which apply a closing force to gate 16 have been actuated in order to resist the downstream movement of bales 30 and 32 caused by downstream motion of ram 14. At the same time bale engaging means 137 has moved upstream beyond ram 14, and new bales 122 and 124 have been fed onto measuring platform 112 adjacent stop 110 responsive to the downstream motion of measuring platform 112 and to the gravitational feed of bales 122 and 124 behind bale supply ramp 108. The next charge of a selected number of slightly compressed bales has thus been measured and forwarded to a position laterally adjacent compression chamber 12.

FIG. 4 shows the situation after ram 14 has reached its downstream extremity of movement and is starting to return in an upstream direction. Gate 16 has now opened concurrent with the beginning of the retraction of ram 14 because they have concurrent control means to actuate these respective motions. Bale engaging means 137 is now moving in a downstream direction and will soon engage highly compressed bale 148 made from slightly compressed bales 30 and 32.

Between the stage shown in FIG. 4 and the stage shown in FIG. 5, binding means 33 complete the binding operation in order to hold highly compressed bale 148 in substantially the configuration it has in FIG. 4. In a preferred mode of the present invention, bale 148 is initially overcompressed with respect to the sizing of the bands such as 152 (FIG. 2) so that the bale will expand as it leaves the compression chamber in order to fill the bands. This allows the bands to be attached before tension is applied to them. A 1000 pound test cord has been found to be sufficiently strong to bind the highly compressed bales of the present invention. A cord of this type can be accomodated by binding means known to the art.

Moving now to FIG. 5, bale engaging means 137 has engaged the trailing edge 146 of highly compressed bale 148 and has begun to eject it from compression chamber 12. This ejection process is materially assisted by the slight outward taper of the downstream portion 52 of compression chamber 12. At the same time, ram 14, and thus measuring platform 112, have retracted to almost their fullest extent, thus allowing bale 124 of the next charge to drop into compression chamber 12. (Bale 22 will drop into compression chamber 12 as well when ram 14 is fully retracted.) This completes a single cycle of the machine as shown in FIGS. 1, 3, 4, and 5.

I claim:

1. A rebaling press adapted to produce a highly compressed bale of fibrous material from slightly compressed bales of fibrous material, comprising:
   a. a longitudinally extending compression chamber having substantially rigid top, bottom, and side lateral walls, an upstream end wall comprising a ram longitudinally movable between upstream and downstream extremes of movement, and a downstream end wall comprising an exit gate, said compression chamber having an upstream portion, an intermediate portion, a downstream portion, and a downstream direction of flow;
   b. feed means adapted to feed slightly compressed bales of fibrous material to said upstream portion of said compression chamber, comprising:
      i. a feed opening in the top wall of said compression chamber sized to accomodate a predetermined number of said slightly compressed bales and having an upstream end nearly adjacent the upstream extreme of movement of said ram and a downstream end upstream of the downstream extreme of movement of said ram;
      ii. a generally horizontal measuring platform within said compression chamber attached to the top of said ram, disposed generally upstream thereof, and positioned to substantially cover said feed opening when said ram is at its downstream extreme of movement and to substantially uncover said feed opening when said ram is at its upstream extreme of movement; and
      iii. means to continuously supply said slightly compressed bales via said feed opening onto said measuring platform responsive to downstream movement of the measuring platform;
   c. means to reciprocate said ram between its upstream and downstream extremes of movement, whereby to alternately load said compression chamber with a pre-determined number of slightly compressed bales and to compress said pre-determined number of slightly compressed bales to form a single highly compressed bale;
   d. binding means adapted to prevent said highly compressed bale from re-expanding substantially;
   e. means to open and close said exit gate; and
   f. ejection means to eject said highly compressed bale from said rebaling press.

2. The rebaling press of claim 1, wherein said exit gate is closed and held in place while said ram advances toward said downstream extremity of movement, and wherein said exit gate is opened while said ram retracts toward said upstream extremity of movement.

3. A rebaling press adapted to produce a highly compressed bale of fibrous material from slightly compressed bales of fibrous material, comprising:
   a. a longitudinally extending compression chamber having substantially rigid top, bottom, and side lateral walls, an upstream end wall comprising a ram longitudinally movable between upstream and downstream extremes of movement and a downstream end wall comprising an exit gate, said compression chamber having an upstream portion, an intermediate portion, a downstream portion, and a downstream direction of flow, wherein said upstream portion of said compression chamber tapers inward along the downstream direction of flow, said intermediate portion of said compression chamber comprises a waist portion of smaller lateral dimensions than those of the intended highly compressed bale, and said downstream portion of said compression chamber tapers outward along the downstream direction of flow;
   b. feed means adapted to feed slightly compressed bales of fibrous material to said upstream portion of said compression chamber;
   c. means to reciprocate said ram between its upstream and downstream extremes of movement, whereby to alternately load said compression chamber with a pre-determined number of slightly compressed bales and to compress said pre-determined number of slightly compressed bales to form a single, highly compressed bale;
   d. binding means adapted to prevent said highly compressed bale from re-expanding substantially;
   e. means to open and close said exit gate; and
   f. ejection means to eject said highly compressed bale from said rebaling press.

4. The rebaling press of claim 3, wherein said ejection means comprises:
   a. an endless conveyor adjacent at least one of said lateral walls, said conveyor having longitudinally extending first and second runs arranged so that downstream movement of said first run results in upstream motion of said second run, and so that upstream movement of said first run results in downstream motion of said second run;
   b. means connecting said first run to said ram, whereby longitudinal movement of said ram causes corresponding longitudinal motion of said first run; and
   c. barbed means attached to said second run and adapted to engage a highly compressed bale within said compression chamber and move it downstream when said second run moves downstream and to disengage any material within said compression chamber when said second run moves upstream.

5. The rebaling press of claim 3, wherein said exit gate is closed and held in place while said ram advances toward said downstream extremity of movement, and wherein said exit gate is opened while said ram retracts toward said upstream extremity of movement.

6. In a press comprising a longitudinally extending compression chamber having substantially rigid top, bottom and side lateral walls, an upstream end wall comprising a longitudinally movable ram, a downstream end wall comprising an exit gate, lateral feed means intermediate said upstream and downstream end walls, and ejection means to eject compacted material through said exit gate, the improvement wherein said ejection means comprises:
  a. an endless conveyor adjacent at least one of said lateral walls, said conveyor having longitudinally extending first and second runs arranged so that downstream movement of said first run results in upstream motion of said second run, and so that upstream movement of said first run results in downstream motion of second run;
  b. means connecting said first run to said ram, whereby longitudinal movement of said ram causes corresponding longitudinal motion of said first run; and
  c. barbed means attached to said second run and adapted to engage highly compacted material within said compression chamber and move it downstream when said second run moves downstream and to disengage any material within said compression chamber when said second run moves upstream.

7. In a press comprising a longitudinally extending compression chamber having substantially rigid top, bottom and side lateral walls, an upstream end wall comprising a hydraulic ram longitudinally movable between upstream and downstream extremities of movement, a downstream end wall comprising a hydraulically actuated exit gate, first and second double action hydraulic cylinder means to respectively reciprocate said ram between said extremities of movement and to open and close said exit gate, and fluid supply means to supply fluid pressure to said first and second hydraulic cylinder means, the improvement wherein said fluid supply means comprises:
  a. first fluid conduit means adapted to convey hydraulic fluid to said first and second hydraulic cylinder means to force said ram downstream and concurrently force said exit gate to close;
  b. second fluid conduit means adapted to convey hydraulic fluid to said first and second hydraulic cylinder means to force said ram upstream and concurrently force said exit gate to open;
  c. two-way valve means having a first position which allows pressurized hydraulic fluid to pass through said first fluid conduit means and a second position which allows pressurized hydraulic fluid to pass through said second fluid conduit means;
  d. first control means to move said valve means to said first position when said ram has reached its upstream extremity of movement; and
  e. second control means to move said valve means to said second position when said ram has reached its downstream extremity of movement; whereby to forceably close said exit gate while said ram advances toward its downstream extremity of movement and to open said exit gate while said ram returns toward its upstream extremity of movement.

8. A rebaling press adapted to produce a highly compressed bale of fibrous material from slightly compressed bales of fibrous material, comprising:
  a. a longitudinally extending compression chamber having substantially rigid top, bottom, and side lateral walls, an upstream end wall comprising a ram longitudinally movable between upstream and downstream extremes of movement, and a downstream end wall comprising an exist gate, said compression chamber having an upstream portion which tapers inward along the downstream direction of flow, an intermediate portion comprising a waist portion of smaller lateral dimensions than those of the intended highly compressed bale, and a downstream portion which tapers outward along the downstream direction of flow;
  b. feed means adapted to feed slightly compressed bales of fibrous material to said upstream portion of said compression chamber, comprising:
    i. a feed opening in the top wall of said compression chamber sized to accomodate a predeterminded number of said slightly compressed bales and having an upstream end nearly adjacent the upstream extreme of movement of said ram and a downstream end upstream of the downstream extreme of movement of said ram;
    ii. a generally horizontal measuring platform within said compression chamber attached to the top of said ram, disposed generally upstream thereof, and positioned to substantially cover said feed opening when said ram is at its downstream extreme of movement and to substantially uncover said feed opening when said ram is at its upstream extreme of movement; and
    iii. means to continuously supply said slightly compressed bales via said feed opening onto said measuring platform responsive to downstream movement of the measuring platform;
  c. means to reciprocate said ram between its upstream and downstream extremes of movement, whereby to alternately load said compression chamber with a pre-determined number of slightly compressed bales and to compress said pre-determined number of slightly compressed bales to form a single highly compressed bale;
  d. binding means adapted to prevent said highly compressed bale from re-expanding substantially;
  e. means to open and close said exit gate; and
  f. ejection means to eject said highly compressed bale from said rebaling press.

9. A rebaling press adapted to produce a highly compressed bale of fibrous material from slightly compressed bales of fibrous material, comprising:
  a. a longitudinally extending compression chamber having substantially rigid top, bottom, and side lateral walls, an upstream end wall comprising a ram longitudinally movable between upstream and downstream extremes of movement, and a downstream end wall comprising an exit gate, said compression chamber having an upstream portion, an intermediate portion, a downstream portion, and a downstream direction of flow;
  b. feed means adapted to feed slightly compressed bales of fibrous material to said upstream portion of said compression chamber, comprising:
    i. a feed opening in the top wall of said compression chamber sized to accomodate a predetermined number of said slightly compressed bales and having an upstream end nearly adjacent the upstream extreme of movement of said ram and a downstream end upstream of the downstream extreme of movement of said ram;
    ii. a generally horizontal measuring platform within said compression chamber attached to the top of said ram, disposed generally upstream thereof, and positioned to substantially cover said feed opening when said ram is at its downstream extreme of movement and to substantially uncover said feed opening when said ram is at its upstream extreme of movement; and iii. means to continuously supply said slightly compressed bales via said feed opening onto said measuring platform responsive to downstream movement of the measuring platform;

c. means to reciprocate said ram between its upstream and downstream extremes of movement, whereby to alternately load said compression chamber with a pre-determined number of slightly compressed balse and to compress said pre-determined number of slightly compressed bales to form a single highly compressed bale;

d. binding means adapted to prevent said highly compressed bales from re-expanding substantially;

e. means to open and close said exit gate; and f. ejection means to eject said highly compressed bales from said rebaling press, comprising;

i. an endless conveyor adjacent at least one of said lateral walls, said conveyor having longitudinally extending first and second runs arranged so that downstream movement of said first run results in upstream motion of said second run, and so that upstream movement of said first run results in downstream motion of said second run;

ii. means connecting said first run to said ram, whereby longitudinal movement of said ram causes corresponding longitudinal motion of said first run; and iii. barbed means attached to said second run and adapted to engage a highly compressed bale within said compression chamber and move it downstream when said second run moves downstream and to disengage any material within said compression chamber when said second run moves upstream.

* * * * *